(12) United States Patent
Kasahara et al.

(10) Patent No.: US 6,373,706 B1
(45) Date of Patent: Apr. 16, 2002

(54) ELECTRONIC DEVICE HAVING TWO SLOTS DIFFERENT IN WIDTH

(75) Inventors: Masaharu Kasahara; Koichi Inoue; Takeshi Murakami, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/259,254

(22) Filed: Mar. 1, 1999

(30) Foreign Application Priority Data

Sep. 14, 1998 (JP) .......................................... 10-259824

(51) Int. Cl.[7] .............................. G06F 1/16; H05K 7/02
(52) U.S. Cl. ....................... 361/725; 361/685; 361/686; 439/928.1
(58) Field of Search ................................ 361/679, 683, 361/684, 655, 686, 728, 729, 730, 724–727; 439/928.1, 945; 429/96–100, 123

(56) References Cited

U.S. PATENT DOCUMENTS

| 5,067,041 A | * | 11/1991 | Cooke et al. ................ 361/685 |
| 5,155,663 A | * | 10/1992 | Harase ........................ 361/685 |
| 5,491,609 A | * | 2/1996 | Dankman et al. ........... 361/686 |
| 5,506,749 A | * | 4/1996 | Matsuda ..................... 361/683 |
| 5,600,542 A | * | 2/1997 | Malgouires ................. 361/732 |
| 5,606,519 A | * | 2/1997 | Viletto ....................... 364/708.1 |
| 5,654,874 A | * | 8/1997 | Suzuki ........................ 361/685 |
| 5,786,984 A | * | 7/1998 | Bonardi et al. ............. 361/686 |
| 6,002,605 A | * | 12/1999 | Iwasaki et al. ............... 365/51 |
| 6,040,979 A | * | 3/2000 | Homer ........................ 361/683 |
| 6,075,694 A | * | 6/2000 | Mills et al. ................. 361/685 |

FOREIGN PATENT DOCUMENTS

| JP | 4-25914 | 1/1992 |
| JP | 4-195211 | 7/1992 |

* cited by examiner

Primary Examiner—Lynn D. Feild
(74) Attorney, Agent, or Firm—Staas & Halsey LLP (57) ABSTRACT

A portable electronic device having a body and a first slot formed in the body for selectively accommodating a battery and a first recording medium drive having substantially the same width as that of the battery. The first slot has a first width. The portable electronic device further has a second slot formed in the body for selectively accommodating a second recording medium drive having a width larger than that of the first recording medium drive and the battery with an attachment attached to a side surface thereof. The second slot has a second width larger than the first width of the first slot. With this configuration, the two batteries having the same shape can be simultaneously accommodated into the first and second slots, thereby allowing long-term driving of the portable electronic device.

6 Claims, 9 Drawing Sheets

ELECTRONIC DEVICE HAVING TWO SLOTS DIFFERENT IN WIDTH

BACKGROUND OF THE INVENTION

1. Field of the Invention

The present invention relates generally to a portable electronic device, and particularly to a portable electronic device having two slots different in width so as to allow insertion of many different kinds of recording medium drives.

2. Description of the Related Art

Portable electronic devices have rapidly come into widespread use in response to a reduction in size and an advance in function of electronic equipment. The portable electronic devices are superior in portability owing to their lightness and compactness. A notebook personal computer as a kind of such portable electronic devices is designed relatively compactly at a low cost, so that there is a limit to the number of peripheral devices that can become standard components upon shipment. Accordingly, after purchasing notebook personal computers, many users are obliged to expand the computers by individually adding peripheral devices as they need for the purpose of improvement in function of the computers.

In another kind if personal computer having a sufficient space inside a body case, such as a desktop personal computer, expansion of the computer is carried out by inserting a desired adapter, card into an expansion slot on an system board. However in the case of a notebook personal computer, a packaging density in its body housing is greatly high and no sufficient space is left, so that insertion of an adapter card is not practical. Because of the compactness, lightness, and portability of a notebook personal computer, it is increasingly used at places where a commercial power is not available. In this case, the notebook personal computer is driven by a rechargeable battery inserted in a slot defined in the body of the computer.

For enhancement of computer's capabilities, there has been proposed a notebook personal computer having two slots for accommodating a battery and a recording medium drive such as a floppy disk drive and a CD-ROM drive. Usually the battery is inserted into one of the two slots, and the CD-ROM drive is inserted into the other slot. In comparing the width of the battery and the width of the CD-ROM drive, they are not equal to each other, but the width of the CD-ROM drive is generally larger than the width of the battery. Accordingly, the two slots formed in the body of the notebook personal computer have different widths. That is, the width of the first slot for insertion of the battery is smaller than the width of the second slot for insertion of the CD-ROM drive.

For realization of long-term driving of the notebook personal computer, it is required to provide a notebook personal computer capable of simultaneously mounting a standard battery (first battery) and a second battery. The standard battery is usually inserted into the first slot, and the second battery is usually inserted into the second slot wider than the first slot. Accordingly, the second battery having a shape corresponding to the shape of the second slot is provided by battery makers.

In this case, it is necessary for the battery makers to develop two kinds of batteries having different shapes, causing an increase in developing cost and no mass-production effects. As a result, the second battery unavoidably becomes expensive. There has been proposed another battery mounting structure allowing two batteries of the same kind to be mounted. In this structure, the standard battery is mounted on a tray having a width equal to the width of the second slot, and this tray is then inserted into the second slot. However, the tray has a large depth, so that when the tray is inserted into the second slot, the tray projects from the body of the notebook personal computer, resulting in an increase in overall external size of the computer.

SUMMARY OF THE INVENTION

It is therefore an object of the present invention to provide an electronic device having a first slot for accommodating a battery or a first recording medium drive and a second slot for accommodating the battery with an attachment attached to a side surface thereof or a second recording medium drive having a width larger than that of the first recording medium drive.

It is another object of the present invention to provide a low-cost battery attachment having a simple structure which can be attached to a side surface of a battery to allow the battery to be inserted into the wider second slot of an electronic device.

In accordance with an aspect of the present invention, there is provided an electronic device comprising a first accommodating portion for removably accommodating a first component unit having a first width, the first accommodating portion having the first width; and a second accommodating portion for removably accommodating any one of a second component unit having a second width larger than the first width and the first component unit with an attachment attached to a side surface thereof for adding a width to the first width to obtain the second width.

Preferably, the first component unit includes a battery or a first recording medium drive. For example, the first recording medium drive is selected from the group consisting of a floppy disk drive and a super disk drive. Preferably, the second component unit includes a second recording medium drive selected from the group consisting of a CD-ROM drive and a hard disk drive.

In accordance with another aspect of the present invention, there is provided an attachment adapted to be attached to a component unit for removable use with an electronic device, comprising an engaging member for engaging the component unit; the attachment having a width set so that when the attachment is attached to a side surface of the component unit by the engaging member, a total width of the attachment and the component unit is equal to a width of an accommodating portion provided in the electronic device for removably accommodating the component unit.

Preferably, the attachment further comprising an elongated portion having a first width; and a head portion having a second width larger than the first width; the second width being set so that the sum of the second width and a width of the component unit is equal to a width of the accommodating portion at its opening exposed to the outside of the electronic device.

In accordance with a further aspect of the present invention, there is provided a component unit for removable use with an electronic device, comprising an engaging member for engaging an attachment; the component unit having a width set so that when the attachment is attached to a side surface of the component unit by the engaging member, a total width of the component unit and the attachment is equal to a width of an accommodating portion provided in the electronic device for removably accommodating the component unit.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERED EMBODIMENTS

Figure 1:
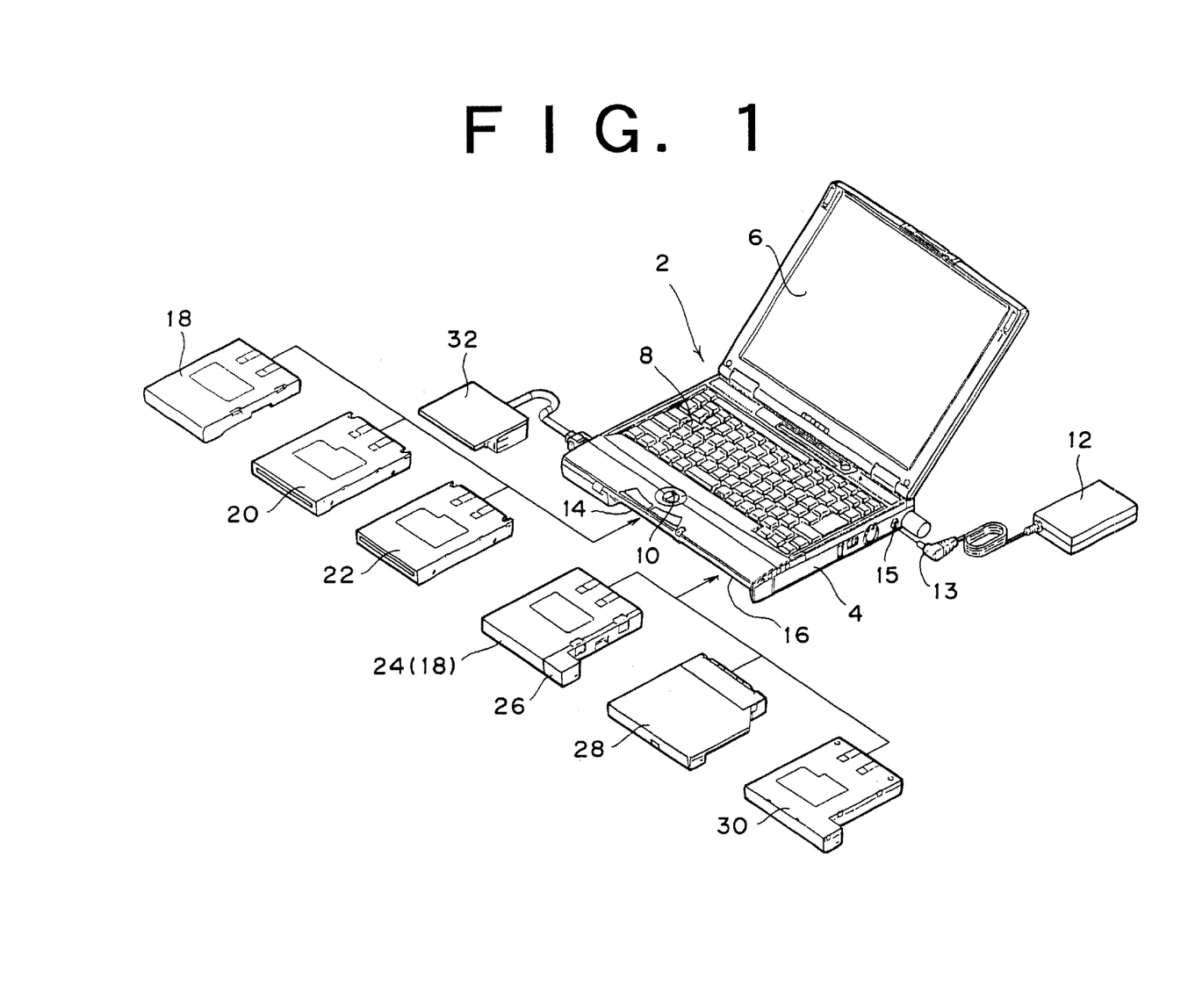
FIG. 1 is a perspective view of a notebook personal computer according to a preferred embodiment of the present invention.

Referring to FIG. 1, there is shown a perspective view of a notebook personal computer 2 according to a preferred embodiment of the present invention. The notebook personal computer 2 has a body 4 and a display 6 such as a liquid crystal display (LCD) pivotably connected to the body 4. The body 4 is provided with a keyboard 8 and a pointing device 10. Reference numeral 12 denoted an AC adapter connectable to a commercial power (not shown). The AC adapter 12 has a plug 13 adapted to be inserted into a jack 15 provided on one side surface of the body 4 of the notebook personal computer 2. By inserting the plug 13 into the jack 15, the notebook personal computer 2 is driven by the commercial power. The body 4 of the notebook personal computer 2 has a front end surface formed with two slots, i, e., a first slot 14 and a second slot 16 wider than the first slot 14.

The first slot 14 is adapted to selectively receive a standard battery (first battery) 18, a floppy disk drive 20, or a super disk drive 22. The standard battery 18, the floppy disk drive 20, and the super disk drive 22 have substantially the same width. On the other hand, the second slot 16 is adapted to selectively receive a second battery 24 with an attachment 26 attached to one side surface thereof, a CD-ROM drive 28, or an additional hard disk drive (HDD) 30. The second battery 24 has the same shape as that of the standard battery 18. Further, a standard HDD (not shown) is built in the body 4 of the notebook personal computer 2.

Reference numeral 32 denoted a floppy disk adapter connectable to the notebook personal computer 2. By connecting the floppy disk drive 20 to the floppy disk adapter 32, the floppy disk drive 20 can be driven. For example, in the case that the standard battery 18 is inserted in the first slot 14, and the CD-ROM drive 28 is inserted in the second slot 16, the floppy disk drive 20 can be used by connecting it to the floppy disk adapter 32.

Figure 2:
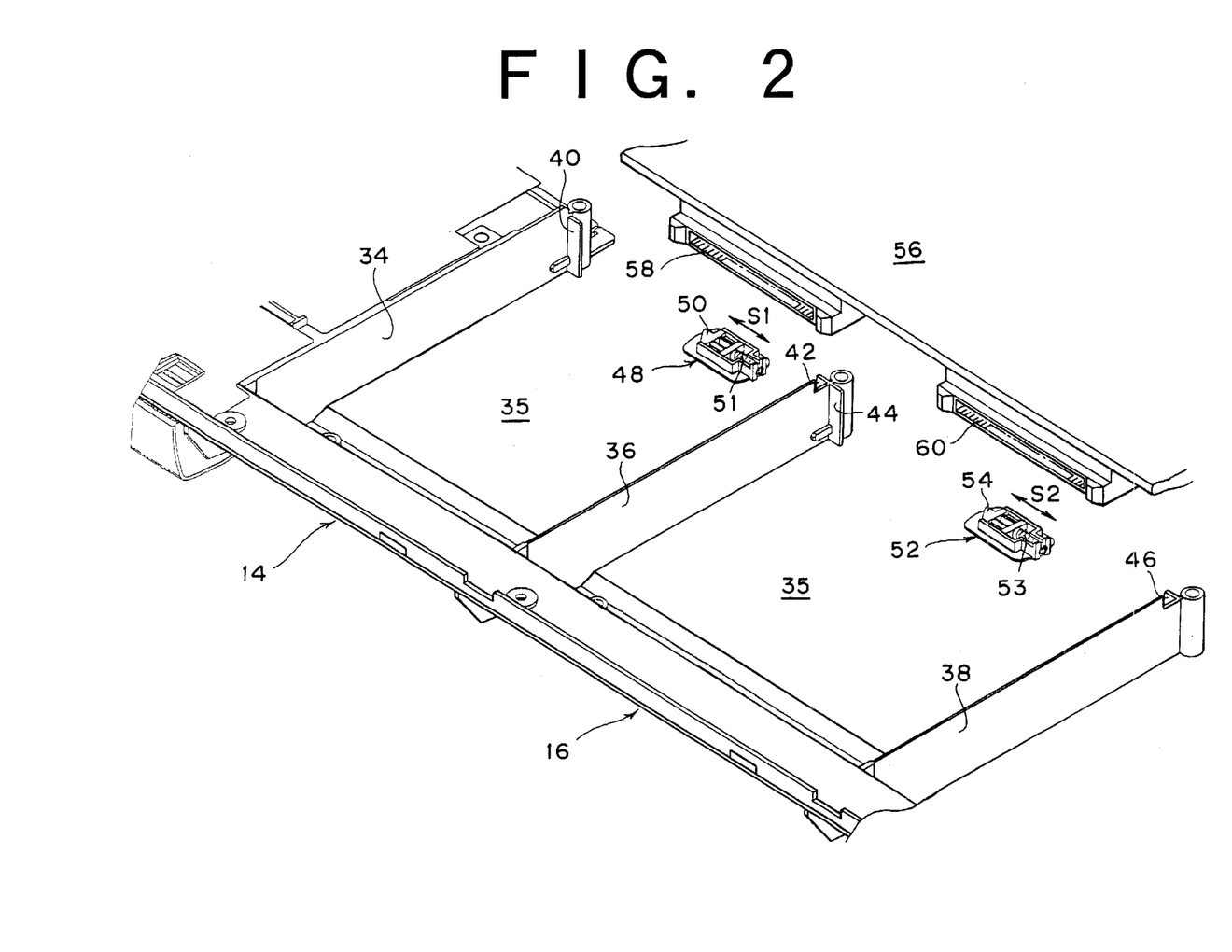
FIG. 2 is a perspective view of first and second slots and their peripheral portion in the notebook personal computer.

Referring to FIG. 2, there is shown a perspective view of the first and second slots 14 and 16 and their peripheral portion in the body 4. The first slot 14 is defined by a pair of parallel guide ribs 34 and 36 and a bottom plate 35 of the body 4, and the second slot 16 is defined by the guide rib 36, a guide rib 38 parallel to the guide rib 36, and the bottom plate 35 of the body 4. As shown in FIG. 2, the second slot 16 has a width larger than that of the first slot 14. For example, the first slot 14 has a width of about 100 mm, a height of about 20 mm, and a depth of about 143 mm, whereas the second slot 16 has a width of about 130 mm, a height of about 20 mm, and a depth of about 143 mm.

A stopper 40 is formed at the rear end of the guide rib 34; two stoppers 42 and 44 are formed at the rear end of the guide rib 36; and a stopper 46 is formed at the rear end of the guide rib 38. A lock mechanism 48 is mounted on the inner surface of the bottom plate 35 at a rear opening of the first slot 14. The lock mechanism 48 includes a hook 50 and a coil spring 51 for biasing the hook 50 in a leftward direction as viewed in FIG. 2. The hook 50 is movable in opposite directions as shown by a double-headed arrow S1 in FIG. 2. Similarly, a lock mechanism 52 is mounted on the inner surface of the bottom plate 35 at a rear opening of the second slot 16. The lock mechanism 52 includes a hook 54 and a coil spring 53 for biasing the hook 54 in a leftward direction a viewed in FIG. 2. The hook 54 is movable in opposite directions as shown by a double-headed arrow S2 in FIG. 2. Reference numeral 56 denotes a printed wiring board built in the body 4 of the notebook personal computer 2. Connector jacks 58 and 60 respectively exposed to the rear openings of the first and second slots 14 and 16 are mounted on the printed wiring board 56.

Figure 3:
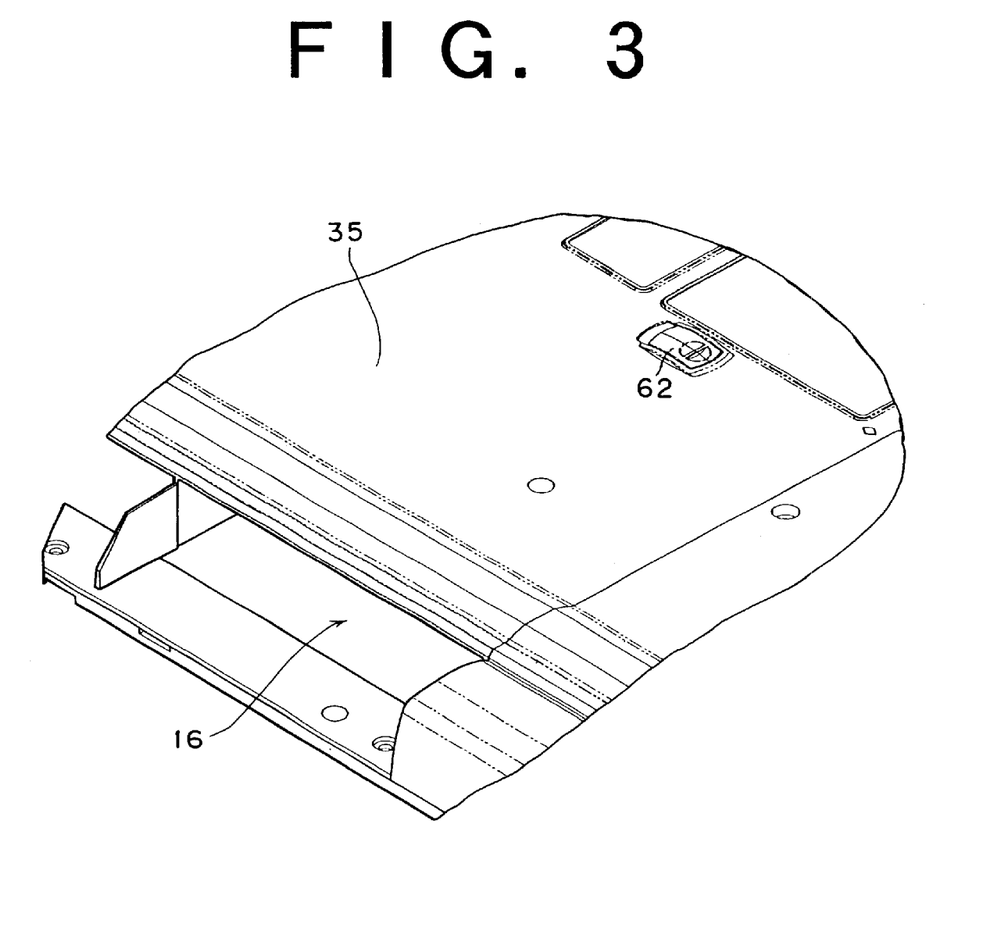
FIG. 3 is a perspective view of the second slot and its peripheral portion as viewed from the bottom side of the notebook personal computer.
Figure 4:
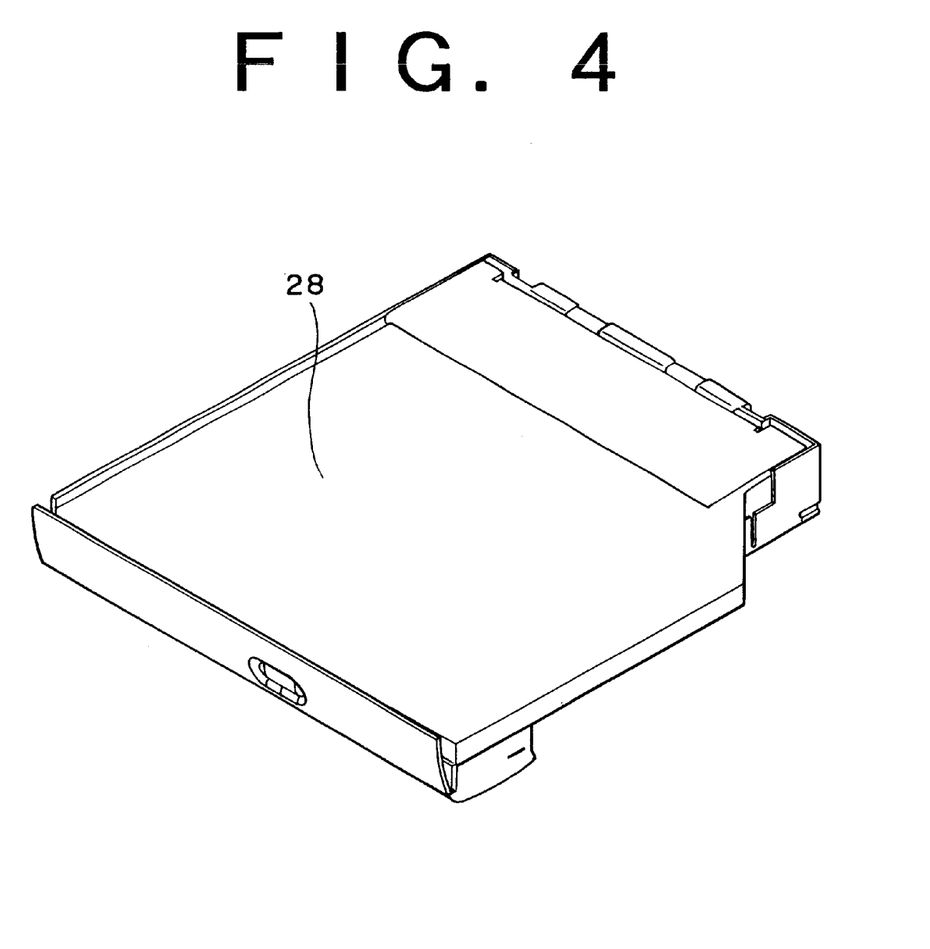
FIG. 4 is a perspective view of a CD-ROM drive insertable into the second slot.

Referring to FIG. 3, there is shown a perspective view of a part of the body 4 in the vicinity of the second slot 16 as viewed from the bottom side of the body 4. A button 62 connected to the hook 54 of the lock mechanism 52 is slidably mounted on the outer surface of the bottom plate 35. Although not shown, a button similar to the button 62 is slidably mounted on the outer surface of the bottom plate 35 and connected to the hook 50 of the lock mechanism 48. FIG. 4 shows a perspective view of the CD-ROM drive 28. The CD-ROM drive 28 has a width equal to the width of the second slot 16.

Figure 5:
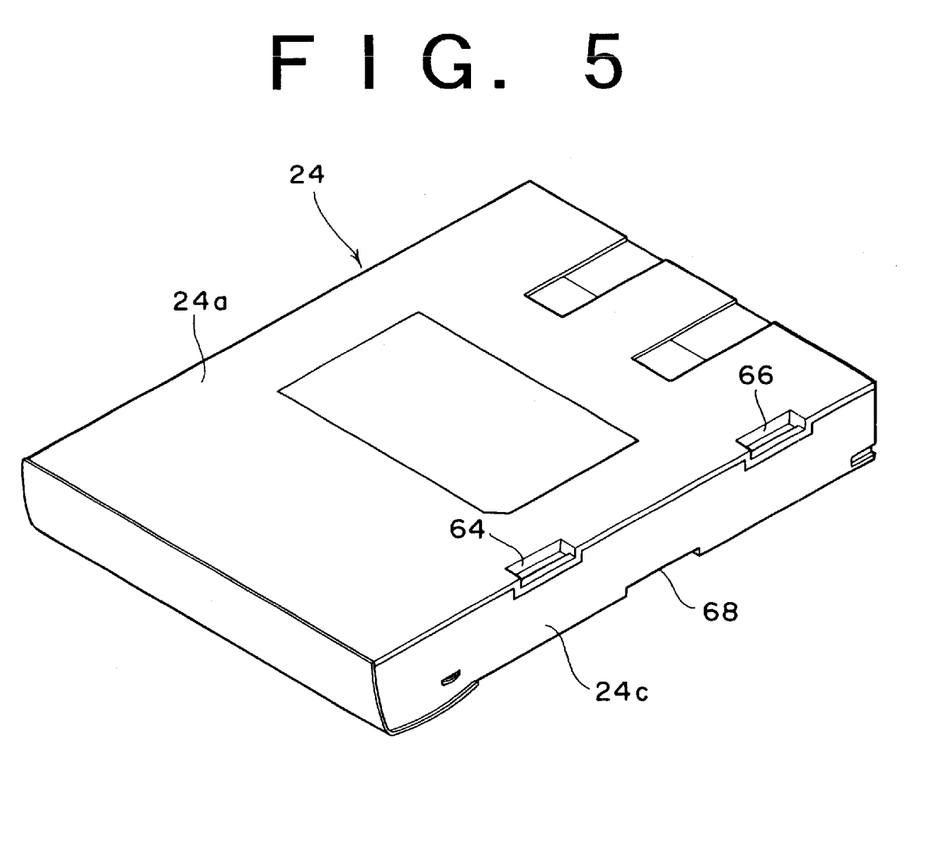
FIG. 5 is a perspective view of a battery insertable into the first or second slot as viewed from top side.
Figure 6:
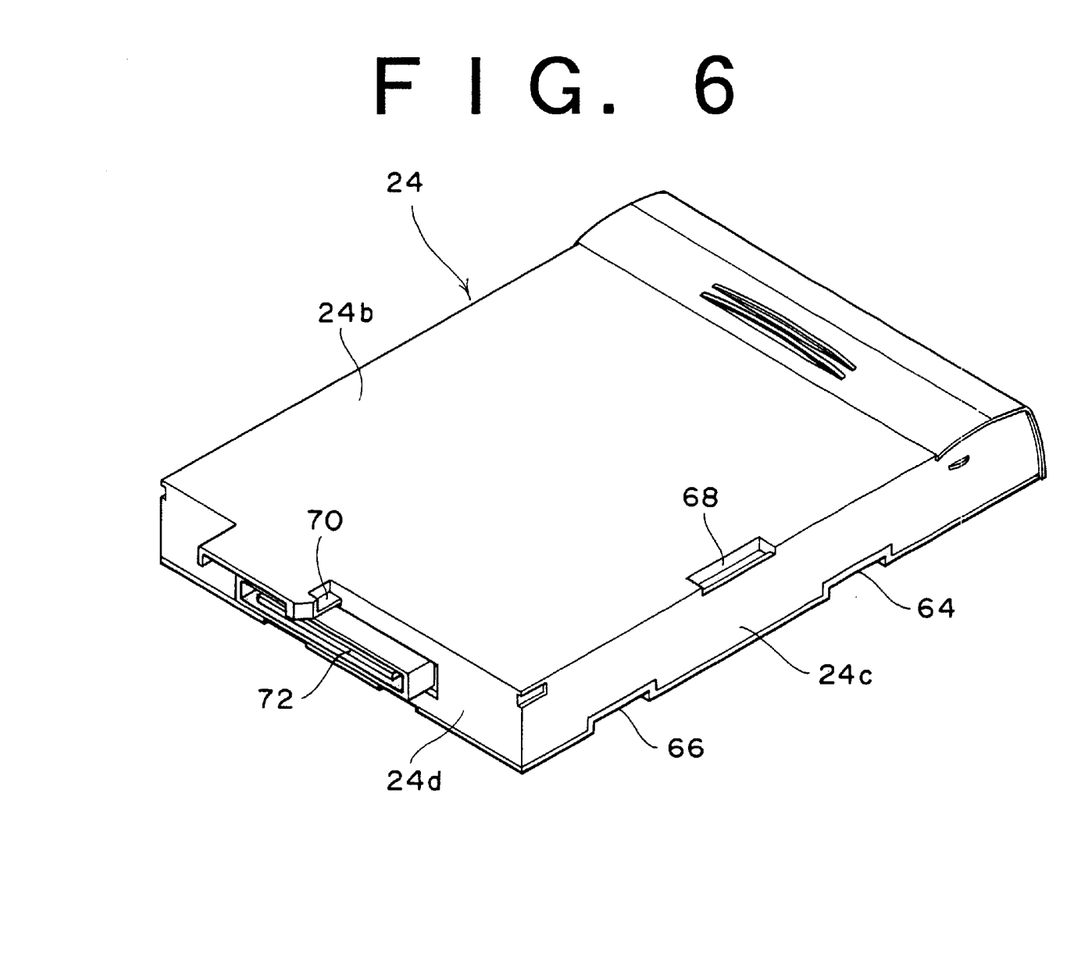
FIG. 6 is a perspective view of the battery as viewed from its bottom side.

FIG. 5 shows a perspective view of the second battery 24 as viewed from its top side, and FIG. 6 shows a perspective view of the second battery 24 as viewed from its bottom side. The standard battery (first battery) 18 has the same shape as that of the second battery 24, so no detailed drawing of standard battery 18 is shown and the same parts as those of the second battery 24 will be hereinafter described by using the same reference numerals. As shown in FIG. 5. a pair of recesses 64 and 66 are formed at an edge portion between an upper surface 24a and a side surface 24c of the second battery 24. As best shown in FIG. 6, another recess 38 is formed at an edge portion between a bottom surface 24b and the side surface 24c of the second battery 24. As shown in FIG. 6, a recess 70 adapted to engage with the hook 54 of the lock mechanism 52 is formed at the rear end the second battery 24 on its bottom side. Further, the second battery 24 has a connector plug 72 adapted to be connected with the connector jack 60 (see FIG. 2).

Figure 7:
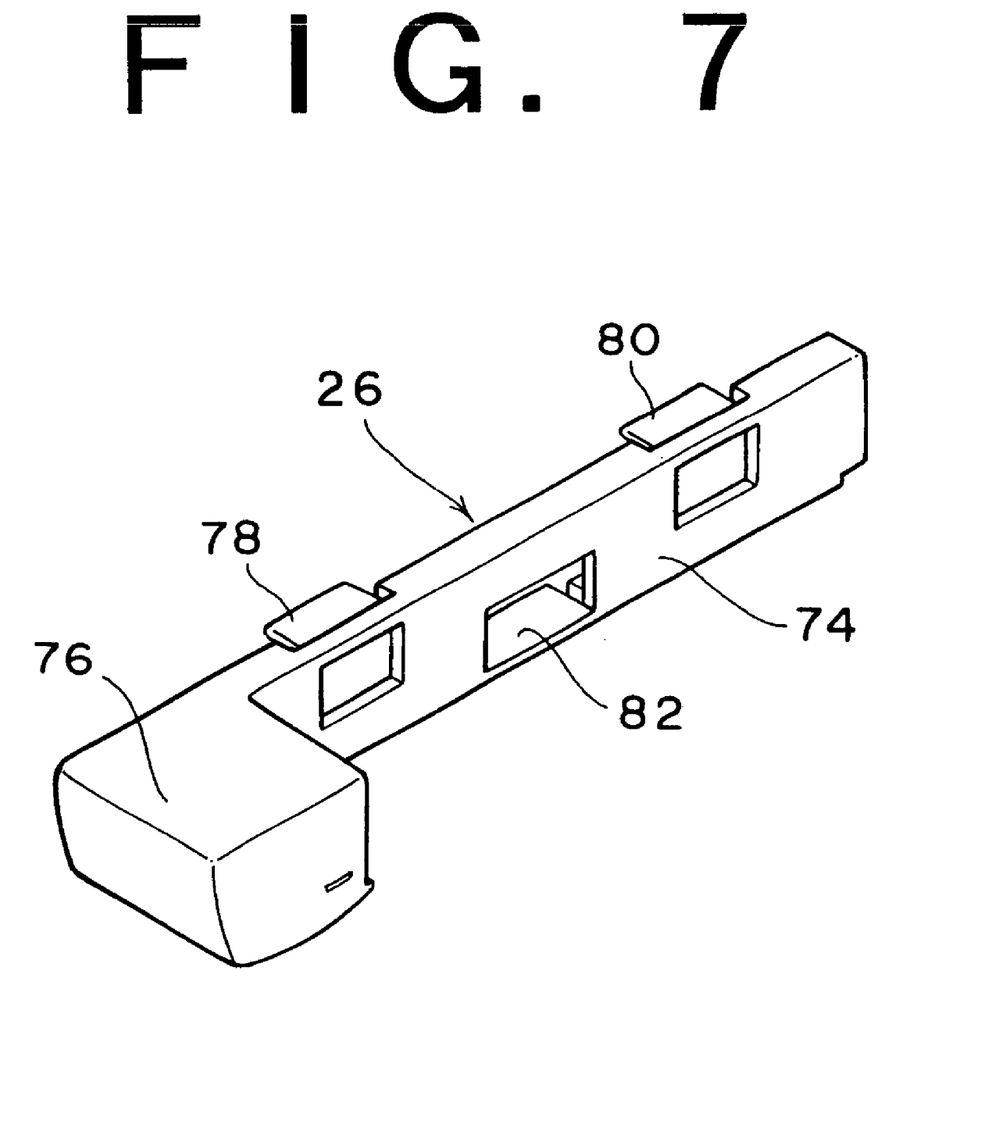
FIG. 7 is a perspective view of a battery attachment to be attached to a side surface of the battery.

Referring to FIG. 7, there is shown a perspective view of the battery attachment 26. The battery attachment 26 includes an elongated portion 74 and a head portion 76 integral with the elongated portion 74. The battery attachment 26 is manufactured by resin molding. The elongated portion 74 of the battery attachment 26 is integrally formed with three hooks 78, 80 and 82 for respectively engaging the recesses 64, 66 and 68 of the second battery 24. There hooks 78, 80 and 82 are formed by cutting and bending corresponding portions of a molded element to be produced into the battery attachment 26.

Figure 8:
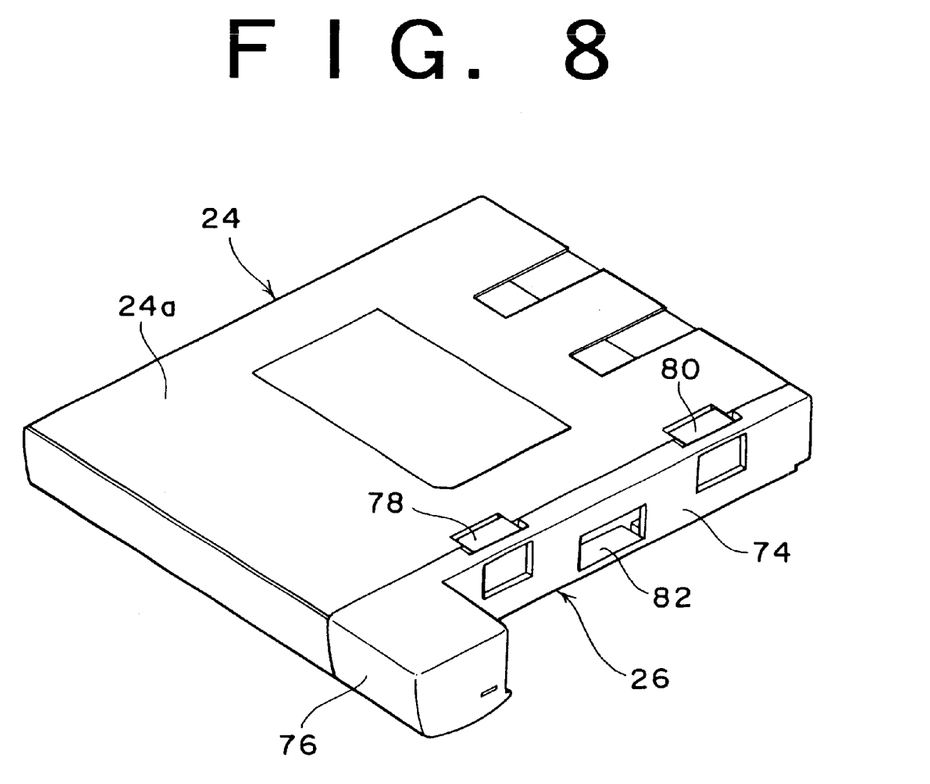
FIG. 8 is a perspective view of the battery and the battery attachment attached to the side surface of the battery.
Figure 9:
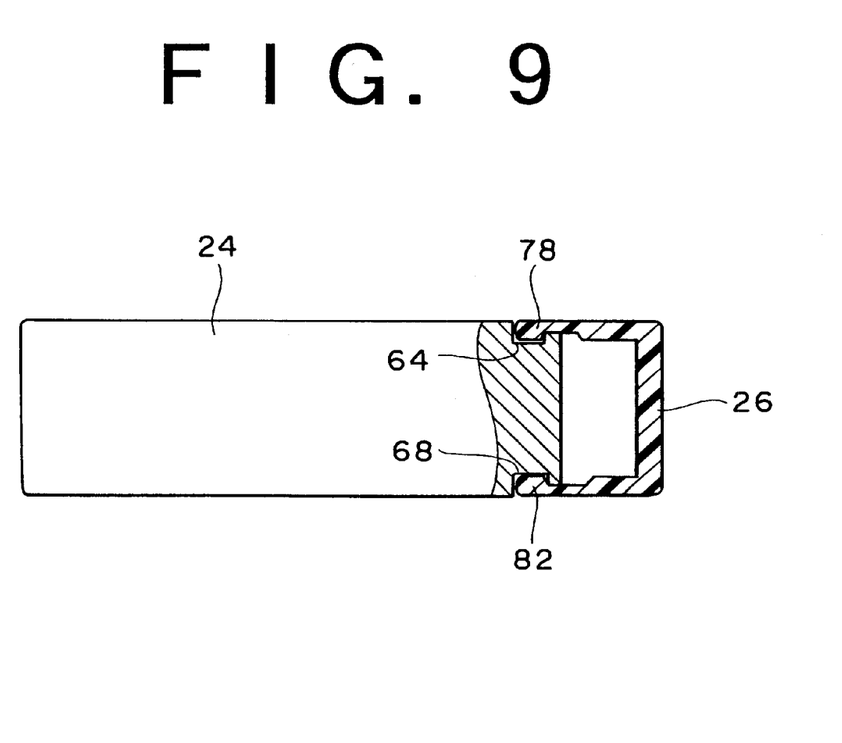
FIG. 9 is a partially sectional, end view of the assembly of the battery and the battery attachment, showing an attachment condition of the battery attachment.

FIG. 8 is a perspective view of the second battery 24 and the battery attachment 26 attached to the side surface 24c of the second battery 24, and FIG. 9 is a partially sectional, end view of the assembly of the second battery 24 and the attachment 26, showing an attached condition of the battery attachment 26. As shown in FIGS. 8 and 9, the hooks 78, 80 and 82 projecting from the elongated portion 74 of the battery attachment 26 are engaged with the recesses 64, 66 and 68 of the second battery 24, respectively, thereby attaching the battery attachment 26 to the side surface 24c of the second battery 24. The width of the head portion 76 of the battery attachment 20 is set so that the sum of the width of the second battery 24 and the width of the head portion 76 of the battery attachment 26 is equal to the width of the second slot 16.

The operation of the notebook personal computer 2 according to the above preferred embodiment will now be described. In the case of intending to drive the computer 2 for long hours, the first battery 18 is inserted into the first slot 14, and the second battery 24 with the attachment 25 attached to the side surface 24c is inserted into the second slot 16. The first battery 18 is inserted until it comes into abutment against the stoppers 40 and 42. In this condition, the connector plug 72 of the first battery 18 is engaged with the connector jack 58 provided in the body 4. At the same time, the hook 50 of the lock mechanism 48 is engaged with the recess 70 of the first battery 18, thereby locking the first battery 18 inserted in the first slot 14.

Similarly, the second battery 24 with the attachment 26 attached to the side surface 24c is inserted into the second slot 16 until the second battery 24 and the attachment 26 come into abutment against the stoppers 44 and 46, respectively. In this condition, the connector plug 72 of the second battery 24 is engaged with the connector jack 60 provided in the body 4. At the same time, the hook 54 of the lock mechanism 52 is engaged with the recess 70 of the second battery 24, thereby locking the second battery 24 inserted in the second slot 16.

In the case of intending to remove the second battery 24 from the second slot 16, the lock mechanism 52 is released in the following manner. That is, when the button 62 shown in FIG. 3 is slid leftward as viewed in FIG. 3, the hook 54 of the lock mechanism 52 is moved rightward as viewed in FIG. 2 against the biasing force of the coil spring 53, so that the hook 54 is disengaged from the recess 70 of the second battery 24, thereby allowing removal of the second battery 24 from the second slot 16. The lock mechanism 48 can also be released in a similar manner.

In the case of intending to use the CD-ROM drive 28, the second battery 24 is first removed from the second slot 16, and the CD-ROM drive 28 is next inserted into the second slot 16. In the case of intending to use the floppy disk drive 20, the first battery 18 is first removed from the first slot 14, and the floppy disk drive 20 is next inserted into the first slot 14. Further, the CD-ROM drive 28 is removed from the second slot 16, and the second battery 24 with the battery attachment 26 is next inserted into the second slot 16. In this condition, the floppy disk drive 20 can be driven by the second battery 24 without using the floppy disk adapter 32.

The reason why the battery attachment 26 has an L-shaped configuration as having the elongated portion 74 smaller in width than the head portion 76 is to allow a component such as a button battery to be mounted in a space defined by the difference in width between the elongated portion 74 and the head portion 76. That is, many components of the notebook personal computer 2 are highly densely packaged, so that it is necessary to ensure a maximum number of installation spaces for the components. Accordingly, by forming the battery attachment 26 into an U-shape, a space for installing a button battery can be ensured.

The button battery is provided by a rechargeable secondary battery, which serves to retain data even when erroneously removing both the first and second batteries 18 and 24 from the first and second slots 14 and 16, respectively. The first battery 18 and the second battery 24 have the same shape, and are provided by lithium ion batteries of the same specifications, for example. In this case, each lithium ion battery can drive the computer 2 for about 1.5 hours. Accordingly, in the case that the first battery 18 is inserted in the first slot 14 and the second battery 24 with the attachment 26 is inserted in the second slot 16, long-term driving of the computer 2 for about 3 hours can be realized.

According to the present invention as described above, a portable electronic device can be driven by inserting two batteries having the same shape into two slots having different widths after attaching a battery attachment having a simple configuration to a side surface of one of two batteries. Accordingly, the portable electronic device can be driven for long hours. Further, the battery attachment itself is simple in configuration and portable, and also after attaching the battery attachment to the side surface of the second battery and inserting the assembly of the second battery and the battery attachment into the slot having a larger width, the battery attachment is not projected from the body of the electronic device.

What is claimed is:

1. An electronic device comprising:
  a first accommodating portion removably accommodating a first component unit having a first width, said first accommodating portion having said first width; and
  a second accommodating portion removably accommodating a second component unit having a second width larger than said first width and said first component unit having an attachment attached to a side surface thereof adding a width to said first width to obtain said second width.

2. An electronic device comprising:
  a body;
  a first accommodating portion formed in said body selectively accommodating a battery and a first recording medium drive having substantially the same width as that of said battery, said first accommodating portion having a first width; and
  a second accommodating portion formed in said body selectively accommodating a second recording medium drive having a width larger than that of said first recording medium drive plus said battery with an attachment attached to a side surface of said battery, said second accommodating portion having a second width larger than said first width of said first accommodating portion.

3. An electronic device according to claim 2, wherein said first width of said first accommodating portion is defined by a pair of parallel guide ribs formed in said body, and said second width of said second accommodating portion is defined by a pair of parallel guide ribs formed in said body.

4. An electronic device according to claim 2, further comprising:
- a first lock mechanism releasably locking one of said battery and said first recording medium drive accommodated in said first accommodating portion; and
- a second lock mechanism releasably locking one of said battery with said attachment attached thereto and said second recording medium drive accommodated in said second accommodating portion.

5. An electronic device according to claim 2, wherein said first recording medium drive is at least one of a floppy disk drive and a super disk drive.

6. An electronic device according to claim 5, wherein said second recording medium drive is at least one of a CD-ROM drive and a hard disk drive.

* * * * *